FIG. 1

INVENTOR.
FREDERIC WILLIAM YOUNG
ATTORNEY

INVENTOR.
FREDERIC WILLIAM YOUNG
BY
ATTORNEY

Aug. 1, 1967   F. W. YOUNG   3,333,484
DRIVE MECHANISM WITH RECIRCULATING BALL BEARING CONNECTION
Filed Aug. 27, 1965   4 Sheets-Sheet 4

INVENTOR.
FREDERIC WILLIAM YOUNG
BY
ATTORNEY

United States Patent Office 3,333,484
Patented Aug. 1, 1967

3,333,484
DRIVE MECHANISM WITH RECIRCULATING
BALL BEARING CONNECTION
Frederic William Young, Canandaigua, N.Y., assignor to Farrel Corporation, Rochester, N.Y., a corporation of Connecticut
Filed Aug. 27, 1965, Ser. No. 483,060
14 Claims. (Cl. 74—424.8)

This invention relates to a drive mechanism, and more particularly to a drive mechanism comprising cooperating nut and screw members, respectively, which are drivingly connected one to the other by a plurality of recirculating ball bearings.

In most prior antifriction screw and nut drive mechanisms the balls are recirculated through the nut or through a tube mounted on the nut. It has, however, been proposed also to recirculate the balls through the screw or through a tubular member secured to the screw; but in such instances, as are known, the balls circulate through less than one turn per circuit. These prior mechanisms, however, have been rather complex, and expensive to manufacture. Moreover, these prior mechanisms have been limited as to length, due to manufacturing problems on the nut and the wind-up of the screw.

One object of the present invention is to provide an improved antifriction screw and nut drive mechanism that is easier to manufacture, and more readily adaptable for different capacity jobs, than previously known such mechanisms.

Another object of this invention is to provide an improved antifriction screw and nut drive mechanism that is capable of transmitting extremely heavy loads between the nut and screw members of the mechanism.

Another object of the invention is to provide an antifriction screw and nut mechanism which is practical for any length screw and nut drive. This is of particular advantage, for instance, in drives for the carriages of machine tools such as large lathes, when the carriage may be required to travel along a bed many feet in length, and where recirculation through a nut or tube extending for substantially the full length of the bed would be impractical.

Another object of the invention is to provide an antifriction screw and nut mechanism in which the balls or other antifriction members circulate through a number of convolutions of the screw thread before entering the by-pass or passage for their recirculation.

Still another object of the invention is to provide improved means for retaining and recirculating the balls during the portion of a revolution of the screw when they are not engaged with the nut.

Other objects of the invention will be apparent hereinafter from the specification and from the recital of the appended claims, particularly when read in conjunction with the accompanying drawings.

Referring now to the drawings by numerals of reference, and first to the embodiment illustrated in FIGS. 1 to 3, 11 designates generally part of an elongate machine bed, such as the bed of a lathe; and 12 designates generally the lathe carriage which is mounted (by conventional means not illustrated) on the bed 11 for horizontal reciprocation therealong.

Figure 1:
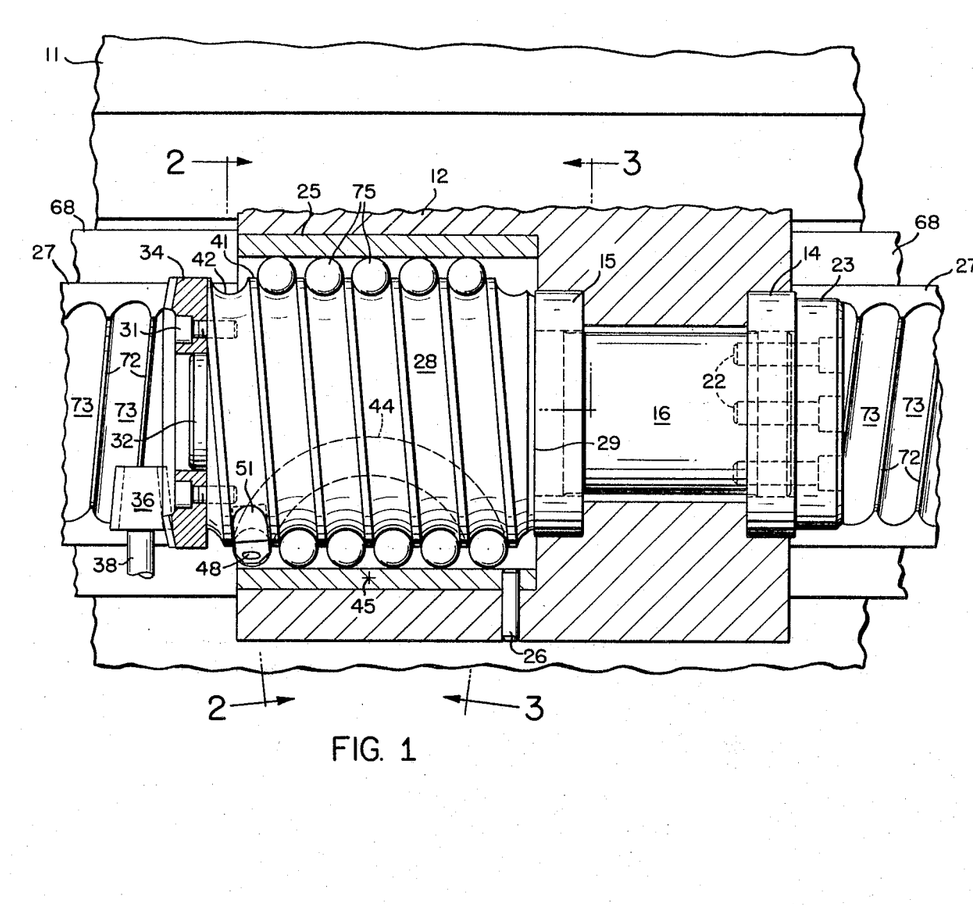
FIG. 1 is a fragmentary, part sectional, part side elevational view of the bed of a lathe and of a carriage mounted on the bed for reciprocal movement under actuation of an antifriction screw and nut drive mechanism made in accordance with one embodiment of this invention.

Mounted to rotate in antifriction thrust bearings 14 and 15 in carriage 12 is a screw shaft 16. Secured over one end (the right end in FIG. 1) of the shaft 16 by screws 22 is a circular cap 23. Cap 23 prevents the shaft 16 from shifting axially toward the left in FIG. 1. The threaded portion of the shaft lies adjacent the opposite end of the shaft. It is of larger diameter than the rest of the shaft and is denoted at 28. It is rotatable in an arcuate, C-shaped sleeve 25, which is secured by dowels 26 (only one of which is illustrated in FIG. 1) in the carriage, and in an elongate segmental nut 27 which will be described further hereinafter. At the juncture of the threaded portion 28 of the shaft 16 with its journal portion, a lateral shoulder 29 is formed, which engages against thrust bearing 15 to hold the shaft 16 against axial movement toward the right in FIG. 1.

Secured by screws 31 to the left hand end of the shaft 16, to seat on a reduced diameter portion 32 thereof, is a hypoid gear 34. The gear 34 and shaft 16 are adapted to be driven by a hypoid pinion 36, which is mounted on a shaft 38 journaled in the tool carriage, and adapted to be driven through any suitable means selectively in opposite directions.

The screw portion 28 of the shaft 16 has a helical land 41 alternating with a helical groove 42, which, as shown more clearly in FIG. 1, is semicircular in cross section. Intermediate its ends the screw portion 28 is provided with an arcuate bore 44, the centerline of which lies in a diametral plane, and which is concentric about an imaginary point 45 (FIG. 1) on the C-shaped member 25. At one end thereof the bore 44 has a combination ingress-egress port 46 (FIG. 2), which opens on the groove 42 at the left end of the screw portion 28. At its opposite end the bore 44 has a further ingress-egress port 47 (FIG. 3), which opens on the groove 42 at the right hand end of the screw portion.

Secured by a bolt 48 in a recess 49 (FIG. 2) formed in the groove 42 at one side of the port 46 is a guide block 51. At one end thereof block 51 has a concave surface 52, which registers with one side of the port 46, and which cooperates with a curved surface 53 formed at the opposite side of the port 46, to form a duct for guiding ball bearings into and out of the port 46.

Adjacent the other end of the screw another block 56 is secured by a screw 57 in a recess 58 formed in the groove 42 which registers with port 47. As is the case with the block 51, the block 56 has at one end thereof a concave surface 59, which registers with one side of the port 47, and which cooperates with a curved surface 60 on the opposite side of the port 47 to form a further duct, that is adapted to guide ball bearings into and out of this port 47. It will be noted that these ducts at opposite ends of the bore 44 curve in opposite directions away from the diametral plane containing the centerline of the bore 44.

Figure 2:
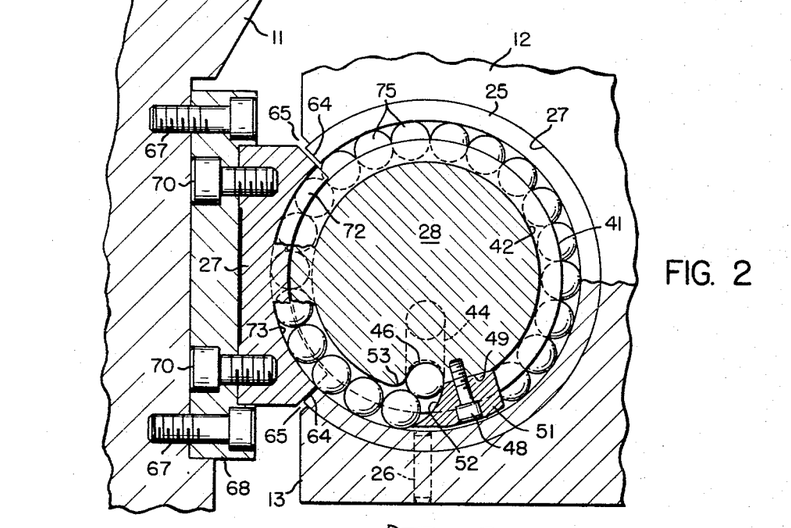
FIG. 2 is a sectional view taken along the line 2—2 in FIG. 1 looking in the direction of the arrows.
Figure 3:
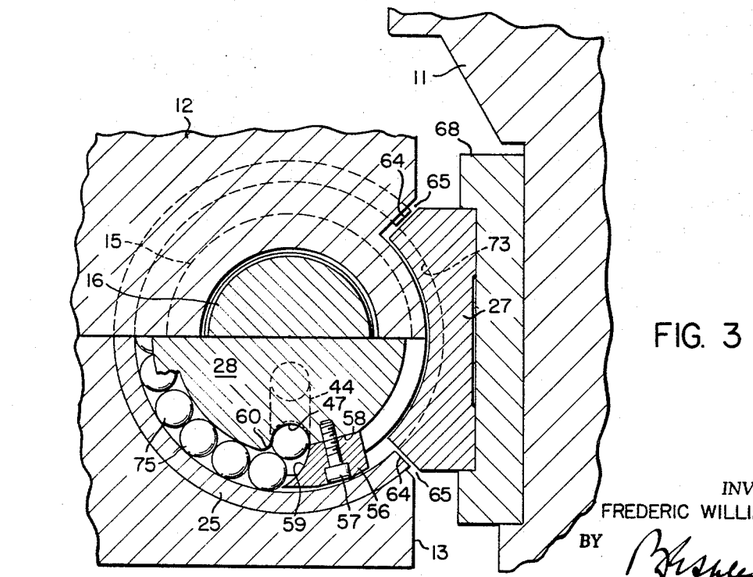
FIG. 3 is a sectional view taken along the line 3—3 in FIG. 1 looking in the direction of the arrows.

As shown more clearly in FIGS. 2 and 3, the gap between the ends 64 of the arcuate member 25 registers with a like opening 65 formed in the inside face or wall 13 of the carriage 12.

Secured by bolts 67 to the side of the bed 11, which faces the carriage 12, is an elongate rack 68. Secured by screws 70 to rack 68 to face carriage 12 is the elongate segmental nut 27, which extends axially for the full length of travel of the carriage. In its outer face the nut 27 has formed thereon segmental-helical threads 72, whose lands project through the opening 65 in the carriage 12 and the registering opening in the arcuate member 25, into closely spaced, registering relation with the lands 41 of screw 28. The member 27 is provided between its lands with segmental, arcuate grooves 73, which register with the grooves 42 of screw 28.

Mounted to roll in the grooves 42 of screw 28 between the registering grooves 73 of nut 27, and the inner peripheral surface of the sleeve 25, and through the arcuate bore 44 in the screw portion 28, are ball bearings 75.

In operation the shaft 38 is rotated in either one direction or the other to effect a corresponding movement of the carriage 12 along the bed 11. For instance, assuming that shaft 16 is rotated to effect clockwise rotation of the screw portion 28 as illustrated in FIG. 2, the ball bearings 75 then housed within the grooves 73 of the stationary segmental nut member 27 will effect longitudinal movement of the carriage 12 toward the right in FIG. 1. During this movement the ball bearings 75 roll along the grooves 73 in a clockwise direction in FIG. 2, and advance toward the right in FIG. 1 around the grooves 42. The advancing ball bearings 75 are guided by member 56 into the port 47, and pass through the bore 44, and out of the port 46, once again to enter the grooves 42 and commence recirculation toward the other end of the screw.

When the shaft 38 is rotated in the opposite direction, the carriage 12 is shifted toward the left in FIG. 1. At this time also, the ball bearings 75 are made to advance around the grooves 42 and 73, which at the moment register longitudinally with the gap in the C-member 25, and toward the outer or left end of the screw 28. In this instance, the advancing ball bearings 75 are guided by the member 51 through the port 46, into the bore 44, and out of the port 47, where they are once again introduced to the grooves 42 for recirculation around the outside of the screw toward the opposite end thereof.

Figures 4, 5:
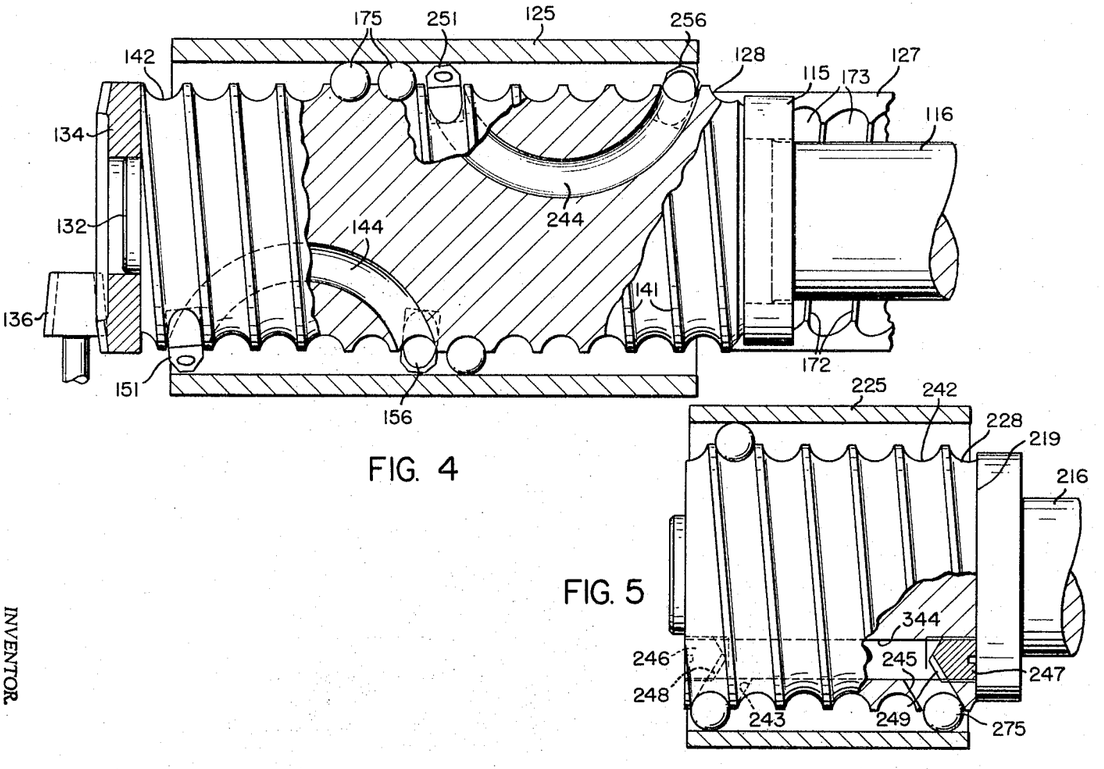
FIG. 4 is a fragmentary sectional view, similar to FIG. 1, but illustrating an antifriction screw and nut mechanism made in accordance with a further embodiment of this invention.
FIG. 5 is a fragmentary sectional view similar to FIG. 1, but on a reduced scale, and illustrating still another embodiment of the invention.

Referring now to the embodiment illustrated in FIG. 4, 128 designates a screw which is integral with a reduced diameter shaft 116, which may be journaled in a carriage in a manner similar to shaft 16. Secured to one end of shaft 116 coaxially thereof in a hypoid gear 134, which meshes with a pinion 136 that is journaled in the carriage for rotation selectively in opposite directions. Surrounding the screw 128 coaxially thereof is a C-member 125, the open side of which faces a segmental nut 127 similar to that illustrated at 27 in the first embodiment.

The screw 128 is provided with a helical land 141, and a helical groove or race 142, which is generally semicircular in cross section. Along the open side of the C-member 125 the segmental-helical lands 172 on the nut 127, which are at any time registering with the gap in the member 125, are disposed close to the thread land 141; and the arcuate grooves or races 173 in the nut 127 register with the race 142 in the same manner as the grooves 73 register with the grooves 42 in the first embodiment.

Unlike the first embodiment, however, the screw portion 125 of the shaft has two, arcuate passageways 144 and 244, respectively, the axial centerlines of which are disposed in a common diametral plane, which extends through the axis of the shaft 116. Although the bores 144 and 244 are generally similar in configuration, they face in opposite directions, and are located adjacent opposite ends, respectively, of the threaded portion 128.

At one end thereof the passage 144 opens on the convolution 142 adjacent the left end of the shaft; and at its opposite end by-pass 144 opens into a convolution 142 approximately midway the length of the screw 128. Secured in recesses in the grooves 142 at opposite ends of the passage 144 to guide ball bearings into, and out of, the ends of the passage are guide members 151 and 156, respectively, which are similar to the members 51 and 56, respectively, in the first embodiment. Opposite ends of by-pass 244 open on convolutions 142 at approximately the midpoint of the threaded portion 128, and adjacent the inner or right hand end of this screw portion, respectively. Guide members 251 and 256 are secured in recesses adjacent opposite ends, respectively, of passage 244 to guide ball bearings into and out of said opposite ends in a manner similar to the members 151 and 156.

Held by the C-member 125 and the nut member 127 for rolling movement in the race 142 are a plurality of ball bearings 175. It is to be understood that, as in the case of the first embodiment, the ball bearings 175 completely fill the race 142 and the passages 144 and 244. When the pinion 136 causes the shaft 116 to rotate, the carriage, or other part, on which the screw is journaled is shifted to the right in FIG. 4 relative to the stationary segmental nut member. At the same time, the ball bearings 175 advance around the race 142, and toward the right in FIG. 4, with half of the ball bearings 175 (those at the left end of the screw 128) advancing through the right end of bore 144 for recirculation to the left; and substantially the remaining half of the ball bearings 175 advancing through the right end of passage 244 for recirculation to the left. When the screw is rotated in the opposite direction, the ball bearings 175 are recirculated in the opposite direction through the race 142 and by-passes 144 and 244. In this second embodiment the use of a double circuit, with two by-passes 144 and 244, permits the screw to be subjected to a considerably greater axial load or thrust than does the single circuit embodiment illustrated in FIGS. 1 to 3.

From the foregoing it will be apparent that applicant has devised a relatively simple and inexpensive drive of the recirculating ball-type, in which the screw member, or externally threaded portion 28 or 128, may be rotated a plurality of times before the recirculating ball bearings 75 or 175 circulate once through their respective circuits defined by the duct 44, 144 or 244, and the portion of the groove or race 42 or 142 associated therewith. This feature considerably minimizes the frictional losses heretofore encountered in prior drives of the recirculating ball bearing-type, and therefore permits considerably greater loads to be transmitted between the threaded portions 28 and 128, respectively, and their associated segmental nut members 27 and 127. Moreover, by employing a rotating screw or threaded portion 28, or 128, in combination with a segmental nut member 27 or 127, it is possible, as a practical matter, to reciprocate the screw 28, or 128, and hence its associated tool carrier 12 or 112, for considerable distances. For instance, in practice several, successive sections of the segmental nut member 27, or 127, may be secured to the lathe bed 11 to provide a stationary nut member of considerable length (e.g., up to 300 feet); and since the tool carrier 12 has a self-contained drive (pinion 36), the carriage may be reciprocated on the bed merely by rotating the relatively small screw 28 or 128.

In some instances, it may be desirable to employ a single or double circuit construction in which the recirculating duct or ducts are substantially straight, rather than being curved intermediate their ends. Such a construction is illustrated in FIG. 5, wherein the screw portion 228 of a shaft 216 is provided with a straight, axially extending duct or bore 344, opposite ends of which open, respectively, on the outer end of screw portion 228, and on the shoulder 229 formed by the portion 228 at its juncture with shaft 216. Bore 344 is radially spaced from the axial centerline of the screw portion 228, and adjacent opposite ends thereof is connected to the root or helical groove 242 on the screw portion 228 by straight bores 243 and 245, respectively, the axes of which are inclined to the axis of bore 344, and which lie in a diametral plane of the screw portion 228 containing the axis of the bore 344.

Threaded into opposite ends of the bore 344 are two plugs 246 and 247, the inner ends of which are provided with concave guiding surfaces 248 and 249, respectively, which register with the walls of the bores 243 and 245 coaxially thereof.

In use, the ball bearings 275, which roll in the groove 242 upon rotation of the shaft 216, are guided either into or out of the outer ends of the ducts 243 and 245 by guide members, which are not illustrated in FIG. 5, but which are similar to the previously described members 51 and 56. At the inner ends of the ducts 243 and 245, the concave faces 248 and 249 on the plugs 246 and 247, respectively, guide the ball bearings into or out of opposite ends of the duct 344, depending upon the direction of rotation of shaft 216.

Figure 6:
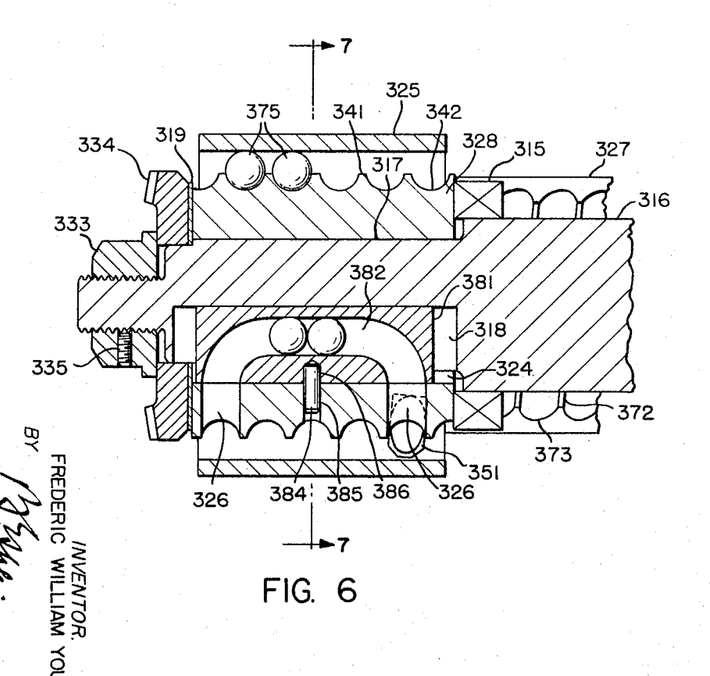
FIG. 6 is a fragmentary sectional view, similar to FIG. 1, but illustrating still a further embodiment of this invention.
Figure 7:
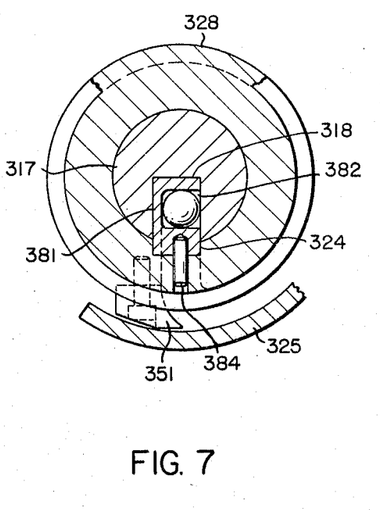
FIG. 7 is a fragmentary sectional view taken along the line 7—7 in FIG. 6 looking in the direction of the arrows.

FIGS. 6 and 7 illustrate a still further modification of this invention, wherein a shaft 316 is mounted by a pair of thrust bearings (only one of which is illustrated at 315) to rotate in a carriage in a manner similar to shaft 16 of the first-described embodiment. Adjacent one end, shaft 316 has a reduced diameter portion 317, which is provided with an axially extending slot or groove 318, that is substantially rectangular in cross section, and that has a depth approximately equal to the radius of shaft portion 317. Surrounding portion 317 coaxially thereof is an externally threaded sleeve 328, which has around its outer periphery a helical groove 342 and land 341 corresponding to the worms in the preceding embodiments.

This sleeve is held against bearing 315 by shim 319 and hypoid gear 334, which are held against the outer end of the sleeve by nut 333 that threads onto the outer end of the shaft. The nut is locked against rotation relative to the shaft by a set screw 335. On its inner surface the sleeve 328 has a generally rectangular, axially extending groove or slot 324, which registers with the groove 318 in the shaft.

Mounted in the confronting grooves 318 and 324, and operative to prevent rotation of the sleeve 328 relative to the shaft 316, is a ball return key 381. In one face thereof the key 381 is provided with a groove 382, opposite ends of which curve radially away from the axis of the shaft 316 and register with radial ports 326 in the sleeve 328. The key 381 is secured against movement in grooves 318 and 324 by a dowel 384, which extends through a hole 385 in the sleeve 328 and into an aligned hole 386 in the key.

Secured in the helical groove 342 adjacent opposite ends, respectively, of the sleeve 328 to guide ball bearings into and out of the ports 326 are two guide members (only one of which is illustrated at 351), which are similar in configuration and function to the members 48 and 51 of the first embodiment.

As in the previously described embodiments, the screw portion (the externally threaded sleeve 328) is surrounded by a C-shaped ball bearing housing 325 the open side of which confronts a segmental nut member 327 on the adjacent machine bed. The segmental grooves 373 and lands 372 on member 327 register through the open side of member 325 with corresponding portions of the groove 342 and land 341 of member 328.

Mounted for rolling movement in the helical groove 342, and longitudinally through the duct or groove 382 in the key 381, upon the rotation of shaft 316, are a plurality of ball bearings 375, which completely fill these grooves 342 and 382.

When the shaft 316 is driven through gear 334 clockwise in FIG. 7, the ball bearings move toward the right in FIG. 6 along the outside of the sleeve 328, radially inwardly through the right hand port 326 in FIG. 6, back, or toward the left, through the duct 382, out of the left hand port 326 to the groove 342 for recirculation once again toward the right. Of course when the shaft is rotated in the opposite direction, the balls 375 recirculate in the direction opposite to that above described.

An obvious advantage of the embodiment shown in FIGS. 6 and 7 is that the shaft 316, sleeve 328 and key 381 may be machined separately to form the grooves 318, 382 and ports 326, which comprise the recirculating or bypass duct for the balls 375. The machined parts can then be assembled as illustrated in FIGS. 6 and 7, and if need be, can thereafter be disassembled for repairs or the like. Moreover, the inner ends of the ports 326 can be made precisely to match the ends of the curved groove 382 milled in the key 381, whereby the latter serves the dual purpose of providing a low resistance path through the screw member, and also prevents relative rotation between the sleeve 328 and shaft 316. Also, the key 381 is slightly offset from the center of the shaft to prevent any imbalances and consequent vibration in the shaft when it is rotated at high speeds.

While the invention has been described in connection with several specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A drive mechanism of the recirculating ball type, comprising
    (a) a rotatable screw member having an external helical groove, and an internal duct, opposite ends of which open onto said groove at axially spaced points therealong,
    (b) means for guiding a plurality of balls for rolling movement in said groove, and through said duct, upon the rotation of said screw member, including
        (1) a segmental nut member having a concave face with a plurality of axially spaced, segmental-helical grooves formed therein and disposed to confront and register with cooperating portions of said groove on said screw member coaxially thereof, and
    (c) means mounting one of said members for axial movement relative to the other of said members upon rotation of said screw member and the movement of said balls between said members.

2. A drive mechanism as defined in claim 1, wherein said duct is arcuate and curves intermediate its ends about an axis which extends at right angles to the axis of said screw member.

3. A drive mechanism as defined in claim 1, wherein
    (a) said screw member has a second internal duct axially spaced from the first-named duct, and disposed at the opposite side of the axis of said screw member from said first-named duct, opposite ends of said second duct opening on the groove of said screw member at axially spaced points therealong, and
    (b) said guiding means includes means for guiding half of said balls through one of said ducts, and the remaining half through the other of said ducts upon rotation of said screw member.

4. A drive mechanism as defined in claim 1, wherein said screw member comprises
    (a) a rotatable shaft having therein an axially extending groove,
    (b) an externally threaded sleeve surrounding said shaft coaxially thereof and having an internal, axially extending groove confronting the first-named groove, and a pair of axially spaced radial ports, and
    (c) a key secured in said confronting grooves and having therein a third groove communicating at opposite ends thereof with said ports, to define said internal duct.

5. A drive mechanism as defined in claim 1, wherein said guiding means further includes
   (a) a third member having a concave face surrounding the remaining portions of said groove on said screw member in radially spaced, confronting, coaxial relation thereto, and
   (b) a fourth member secured in a recess in said screw member adjacent each end of said duct, and having a curved surface extending across said groove adjacent the adjacent end of said duct to guide said balls through the last-named end upon rotation of said screw member.

6. A drive mechanism as defined in claim 5 wherein the concave face on said third member is smooth.

7. A drive mechanism of the recirculating ball type, comprising
   (a) a pair of members, each of which has a concave face, and one of which faces has an axial length greater than the other of said faces,
   (b) means mounting said members with said faces disposed in confronting, coaxial relation, and to permit relative movement between said members in a direction axially of the common axis of said faces,
   (c) an externaly threaded shaft mounted to rotate between said faces in radially spaced coaxial relation therewith, and having on its perimeter a helical, axially extending thread, and having an internal duct, opposite ends of which open on the root of said thread at points axially spaced along said shaft,
   (d) a plurality of axially spaced, segmental-helical threads projecting from the concave face of one of said members into confronting, registering relation with cooperating portions of said threads on said shaft, and
   (e) a plurality of balls mounted between said members and said shaft, respectively, for rolling movement in the root of said thread on said shaft, and through said duct, upon the rotation of said shaft,
   (f) diametrally opposite sides of said balls projecting between the segmental threads on said one member, and the registering portions of said thread on said shaft, during the movement of said balls between said one member and said shaft, thereby to effect relative axial movement between said members.

8. A drive mechanism as defined in claim 7, wherein intermediate its ends said duct extends for a substantial portion of its length parallel to the axis of said shaft.

9. A drive mechanism as defined in claim 7, wherein said duct curves intermediate its ends about an axis which extends normal to the axis of said shaft.

10. In a machine having an elongate bed, and a tool carrier mounted for reciprocation on said bed, a drive mechanism for said carrier, comprising
   (a) a shaft journaled in said carrier to rotate about an axis parallel to the length of said bed, and having on its periphery a helical, axially extending thread, and having an internal duct, opposite ends of which open on the root of said thread at points axially spaced along said shaft,
   (b) a first member secured to said bed and having an elongate, concave face upon which is formed a plurality of axially spaced, segmental-helical threads, that are disposed in confronting, coaxial registry with cooperating portions of said thread on said shaft,
   (c) a second member having a concave surface which surrounds the remaining portions of said thread coaxially thereof, and
   (d) a plurality of ball bearings guided by said members for rolling movement in the root of said thread on said shaft, and through said duct, upon the rotation of said shaft,
   (e) diametrally opposite sides of said bearings projecting between the segmental threads on said first member, and the registering portions of said thread on said shaft, respectively, during the movement of said bearings between said first member and said shaft to effect movement of said carrier longitudinally of said bed.

11. In a machine having an elongate bed, and a tool carrier mounted for reciprocation on said bed, a drive mechanism for reciprocating said carrier, comprising
   (a) a first member fixed to said bed, and having in its outer face an elongate, concave recess which extends parallel to said bed,
   (b) a shaft having an axial length shorter than the axial length of said recess, and journaled in said carrier to rotate selectively in opposite directions about the axial centerline of said recess, and in radial spaced relation to the face thereof,
   (c) said shaft having in its periphery a helical groove, which extends a plurality of times around said shaft coaxially thereof,
   (d) said first member having formed in said face of said recess, and coaxially thereof, a plurality of axially spaced, segmental-helical grooves, which are disposed in confronting registry with portions of the first-named groove formed on said shaft,
   (e) a second member mounted on said carrier and surrounding the remaining portions of said first-named groove in radially spaced coaxial relation therewith,
   (f) a plurality of ball bearings guided by said first and second members to roll, when said shaft is rotated, in said first-named groove axially of said shaft, and in the direction of rotation of said shaft, with diametrally opposite sides of each of said bearings projecting into one of said grooves in said first member, and into the registering portion of said first-named groove, respectively, upon the rolling movement of said bearings between said first member and said shaft, thereby to effect movement of said carrier longitudinally of said bed,
   (g) said shaft having therein at least one internal duct opposite ends of which open upon said first-named groove at axially spaced points therealong, and through which duct said bearings circulate upon the rotation of said shaft, and
   (h) means fixed on said shaft and extending into said first-named groove adjacent each end of said duct to guide said bearings through the adjacent end of said duct, when said shaft is rotated.

12. In a machine as defined in claim 11, wherein
   (a) said second member is C-shaped having its open side facing and extending parallel to said outer face of said first member,
   (b) said outer face of said first member projects into the open side of said second member, and
   (c) the radial distances from the axis of rotation of said shaft to the inner peripheral surface of said second member, and to the bottom of the segmental-helical grooves in said first member, respectively, are equal.

13. A drive mechanism of the recirculating ball type, comprising
   (a) a segmental nut member having in its face an elongate, segmental helical thread,
   (b) a rotatable, externally threaded screw member having intermediate its ends an external duct, and having in its periphery a helical thread complementary to said segmental thread,
   (c) means mounting one of said members for axial movement relative to the other of said members upon rotation of said screw member,
   (d) means including a plurality of ball bearings interposed between said members for effecting the axial movement of said one member upon rotation of said screw member, and
   (e) means operative upon the rotation of said screw member for circulating said ball bearings in the root of the second-named thread around the outside of said screw member from one end thereof toward the other end, and through said internal duct in said screw member from said other end to said one end.

14. A drive mechanism as defined in claim 13, wherein
(a) said screw member has therein an axially extending opening, and a pair of axially spaced ports adjacent opposite ends thereof, respectively,
(b) each of said ports opens at one end on said axially extending opening and at its opposite end on the root of said second-named thread, and
(c) the last-named means comprises a third member removably secured in said axially extending opening, and having intermediate its ends a recess opposite ends of which register with said ports to define said duct.

References Cited
UNITED STATES PATENTS

| 2,975,649 | 3/1961 | Probst | 74—424.8 |
| 3,154,954 | 11/1964 | Geyer | 74—424.8 |
| 3,244,022 | 4/1966 | Wysong | 74—424.8 |

DONLEY J. STOCKING, *Primary Examiner.*

L. H. GERIN, *Assistant Examiner.*

UNITED STATES PATENT OFFICE
Certificate

Patent No. 3,333,484                                          Patented August 1, 1967

Frederic William Young

Application having been made by Frederic William Young, the inventor named in the patent above identified; Theodore E. Fitch of Rochester, New York; and Farrel Corporation, Rochester, New York, a corporation of Connecticut, the assignee, for the issuance of a certificate under the provisions of Title 35, Section 256, of the United States Code, adding the name of the said Theodore E. Fitch as a joint inventor, and a showing and proof of facts satisfying the requirements of the said section having been submitted, it is this 3rd day of December 1968, certified that the name of the said Theodore E. Fitch is hereby added to the said patent as a joint inventor with the said Frederic William Young.

EDWIN L. REYNOLDS,
*First Assistant Commissioner of Patents.*

[SEAL]

UNITED STATES PATENT OFFICE
CERTIFICATE OF CORRECTION

Patent No. 3,333,484      Dated August 1, 1967

Inventor(s)   Frederic William Young et al.

It is certified that error appears in the above-identified patent and that said Letters Patent are hereby corrected as shown below:

Column 8, line 65, "an external duct" should read -- an internal duct --.

Signed and sealed this 4th day of May 1971.

(SEAL)
Attest:

EDWARD M. FLETCHER, JR.
Attesting Officer

WILLIAM E. SCHUYLER, JR.
Commissioner of Patents